United States Patent
Jan et al.

(10) Patent No.: US 7,975,969 B2
(45) Date of Patent: Jul. 12, 2011

(54) ROTATABLE POSITIONING STRUCTURE

(75) Inventors: Te-Sheng Jan, Taipei Hsien (TW);
Yu-Tao Chen, Taipei Hsien (TW);
Chun-Che Yen, Taipei Hsien (TW);
Meng-Hua He, Shenzhen (CN);
Jian-Jun Li, Shenzhen (CN);
Zheng-Qiang Song, Shenzhen (CN);
Gang Cheng, Shenzhen (CN);
Bing-Jing Xu, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 471 days.

(21) Appl. No.: 12/102,015

(22) Filed: Apr. 14, 2008

(65) Prior Publication Data

US 2009/0101785 A1    Apr. 23, 2009

(30) Foreign Application Priority Data

Oct. 23, 2007   (CN) .......................... 2007 1 0202217

(51) Int. Cl.
*A47F 5/00*   (2006.01)
(52) U.S. Cl. ............... 248/125.7; 248/349.1; 248/274.1; 403/164; 108/103; 108/139
(58) Field of Classification Search ............... 248/125.7, 248/276.1, 346.01, 349.1, 371, 131, 144, 248/521, 522, 919, 917, 921, 923, 312; 108/103, 108/139, 21; 403/164; 361/679.01, 679.02, 679.23, 679.21
See application file for complete search history.

(56) References Cited

U.S. PATENT DOCUMENTS

| | | | | |
|---|---|---|---|---|
| 4,589,713 A | * | 5/1986 | Pfuhl et al. | 439/162 |
| 5,236,216 A | * | 8/1993 | Ratzek | 280/607 |
| 5,588,625 A | * | 12/1996 | Beak | 248/371 |
| 6,010,111 A | * | 1/2000 | Cho | 248/346.06 |
| 6,032,918 A | * | 3/2000 | Cho | 248/688 |
| 6,234,494 B1 | * | 5/2001 | Gien | 280/14.24 |
| 6,783,146 B1 | * | 8/2004 | Coing | 280/618 |
| 6,945,837 B2 | * | 9/2005 | Crumrine et al. | 441/70 |
| 7,806,380 B2 | * | 10/2010 | Faull et al. | 248/349.1 |
| 2009/0101786 A1 | * | 4/2009 | Faull et al. | 248/425 |
| 2009/0223102 A1 | * | 9/2009 | Li et al. | 40/763 |

FOREIGN PATENT DOCUMENTS

| | | |
|---|---|---|
| CN | 1977463 A | 6/2007 |
| CN | 2908900 Y | 6/2007 |
| TW | I266221 | 11/2006 |
| TW | I285007 | 8/2007 |

* cited by examiner

*Primary Examiner* — Terrell Mckinnon
*Assistant Examiner* — Todd M. Epps
(74) *Attorney, Agent, or Firm* — Frank R. Niranjan

(57) ABSTRACT

An exemplary rotatable positioning structure includes a first element and a second element. The first element includes a positioning track portion and defining a hole therein. The second element includes a pivot shaft engaging in the hole. The pivot shaft includes a through hole defined therethrough, a restriction portion and a positioning portion. The first element is restricted by the restriction portion of the pivot shaft. The positioning portion and the positioning track portion are capable of making the first element and the second element maintain a fixed position after relatively rotation therebetween.

10 Claims, 2 Drawing Sheets

ROTATABLE POSITIONING STRUCTURE

BACKGROUND OF THE INVENTION

1. Field of the Invention

The present invention generally relates to a rotatable positioning structure for use in an electronic device.

2. Discussion of the Related Art

Various kinds of electronic devices may include two or more functional modules. For example, a remote controlled projector, includes a radio module and a projector module. Generally, the radio module and the projector module are fixed together. However, if a direction of projection is required to change, the remote controlled projector should be rotated wholly. Thus the use of the fixed radio module is inconvenient.

What is needed, therefore, is a rotatable positioning structure used for an electronic device that can overcome the above-mentioned shortcomings.

SUMMARY

A rotatable positioning structure includes a first element and a second element. The first element includes a positioning track portion and defining a hole therein. The second element includes a pivot shaft engaging in the hole. The pivot shaft includes a through hole defined therethrough, a restriction portion and a positioning portion. The first element is restricted by the restriction portion of the pivot shaft. The positioning portion and the positioning track portion are capable of making the first element and the second element maintain a fixed position after relatively rotation therebetween.

Other novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present rotatable positioning structure. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present rotatable positioning structure in detail.

Figure 1:
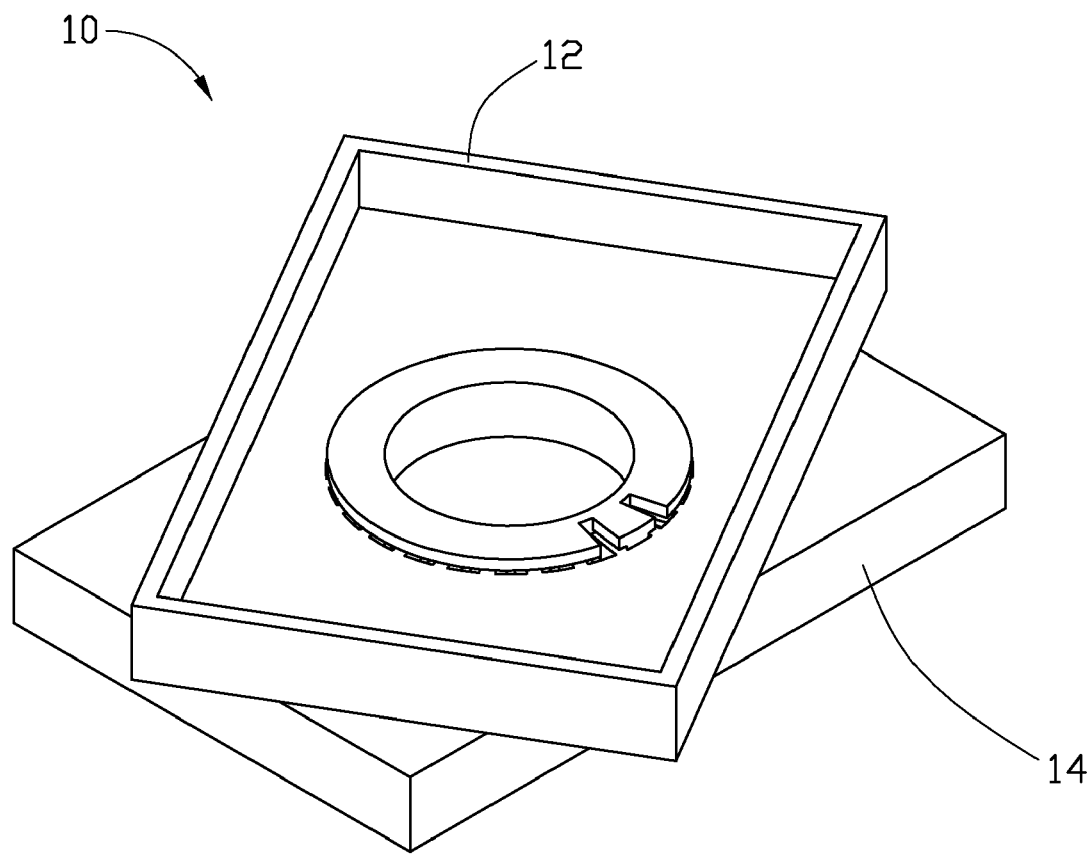
FIG. 1 is an assembled view of a rotatable positioning structure in accordance with a preferred embodiment of the present invention.
Figure 2:
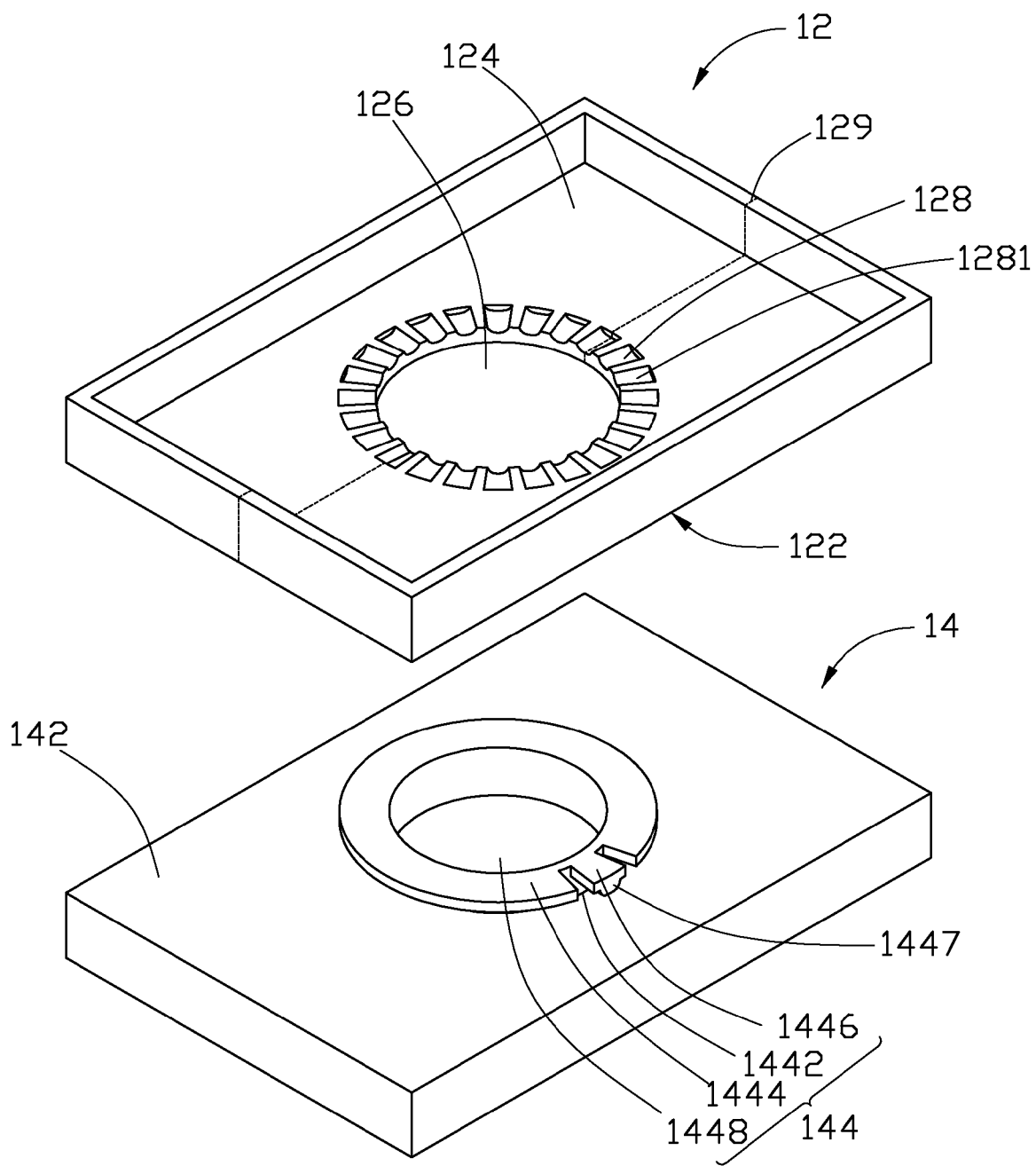
FIG. 2 is an exploded view of the rotatable positioning structure of FIG. 1.

Referring to FIGS. 1 and 2, a rotatable positioning structure 10 according to a preferred embodiment is shown. The rotatable positioning structure 10 adopted by an electronic device. The rotatable positioning structure 10 includes a first element 12 and a second element 14. The first element 12 includes a first surface 122, a second surface 124, and a positioning track portion 128. The first surface 122 and the second surface 124 are on opposite sides of the first element 12. A hole 126 is defined through the first element 12. The hole 126 is circular. The positioning track portion 128 defines a plurality of positioning grooves 1281 around the hole 126. The positioning grooves 1281 are spaced apart from each other. Preferably, the positioning grooves 1281 are formed and spaced uniformly around the hole 126. A vertical cross-section of each positioning groove 1281 is U-shaped. In an alternative embodiment, the vertical cross-section of each positioning groove 1281 is V-shaped.

The second element 14 includes a surface 142 facing the first element 12, and a pivot shaft 144 disposed on the surface 142. The pivot shaft 144 is configured to engage in the hole 126 of the first element 12. The pivot shaft 144 includes a neck portion 1442, a restricting portion 1444, and a positioning portion 1446. An outer surface of the neck portion 1442 is circular. A diameter of the outer surface of the neck portion 1442 is less than a diameter of the hole 126. The restriction portion 1444 is a flange disposed on an end of the neck portion 1442 distal from the surface 142. A cutout (not labeled) is defined in the restriction portion 1444. The positioning portion 1446 is a resilient stub extending from the end of the neck portion 1442 at the cutout. The positioning portion 1446 includes a protrusion 1447. A shape of the protrusion 1447 corresponds to the positioning groove 1281 of the first element 12. A vertical cross-section of protrusion 1447 is U-shaped. The pivot shaft 144 further includes a through hole 1448 that runs through the second element 14. The through hole 1448 is configured for wires/cables of the electronic device to pass through the first element 12 and the second element 14 conveniently.

To assemble the rotatable positioning structure 10, the first element 12 is separated into two parts along a divided line 129. In the preferred embodiment, the divided line 129 divides the first element 12 into two symmetrically equal halves. The two parts are then engagingly reassembled onto the second element 14 with the positioning track portion 128 slid under the pivot shaft 144 correspondingly. The two parts of the first element 12 are then fixed together with an adhesive substance, a fastening member, a latching member, or by welding.

In use, the first element 12 is restricted by the restricting portion 1444 of the pivot shaft 144 of the second element 14, thus the first element 12 cannot detach from the second element 14. In addition, the protrusion 1447 of the positioning portion 1446 engages in the positioning track portion 128, thus a radial positioning between the first element 12 and second element 14 is fixed. Furthermore, because the positioning portion 1446 has elasticity, when a rotational force is applied to the positioning portion 1446, the positioning portion 1446 becomes deformed, and the protrusion 1447 of the positioning portion 1446 can be moved from one of the positioning grooves 1281 to another adjacent positioning groove 1281 according to the direction of the rotational force. That is, the first element 12 and second element 14 would relatively rotate systematically, and thus the electronic device using the rotatable positioning structure 10 can be used conveniently.

It is noted that the scope of the present rotatable positioning structure is not limited to the embodiments described above. For example, the positioning track portion 128 can be disposed on the first surface 122 of the first element 12, and the positioning portion 1446 is configured on an end of the neck portion 1442 adjacent to the surface 142 correspondingly. The positioning track portion 128 and the positioning portion 1446 can be replaced by a pair of gears that engages with each other. The pivot shaft 144 can be molded separately, and then fixed with the second element 14 after other portions of the second element 14 assembled with the first element 12. The restriction portion 1444 can be a bearing fixed on the neck portion 1442 and tightly engaged in the hole 126. In addition, it can be understood that, if the rotatable positioning structure is used in a remote controlled projector including a radio module and a projector module, the radio module can be located in/on one of the first element 12 and the second element 14 and the projector module can be in/on another one of the first element 12 and the second element 14.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rotatable positioning structure comprising:
    a first element including a positioning track portion and defining a hole therein, the positioning track portion defining a plurality of positioning grooves around the hole; and
    a second element comprising a surface and a pivot shaft formed on the surface engaging through the hole for mounting the first element on the second element, the pivot shaft comprising:
    a through hole defined therethrough,
    a restriction engaging in the positioning track portion, the first element restricted by the restriction portion of the pivot shaft, and
    a positioning portion comprising a protrusion;
    wherein the positioning grooves are defined at a top surface of the positioning track portion facing away from the surface of the second element, and extending towards the hole along a radial direction of the hole, therefore the positioning portion and the positioning track portion capable of making the first element and the second element maintain a fixed position after relatively rotation therebetween.

2. The rotatable positioning structure as claimed in claim 1, wherein the plurality of positioning grooves are spaced apart from each other.

3. The rotatable positioning structure as claimed in claim 2, wherein the pivot shaft further comprises a neck portion, the restriction portion and the positioning portion are on an end of the neck portion.

4. The rotatable positioning structure as claimed in claim 3, wherein the positioning portion is a resilient stub.

5. The rotatable positioning structure as claimed in claim 4, wherein a shape of the protrusion corresponds to that of each positioning groove.

6. The rotatable positioning structure as claimed in claim 4, wherein the restriction portion is a flange.

7. The rotatable positioning structure as claimed in claim 3, wherein the first element comprises a first surface and a second surface on opposite sides of the first element, the first surface faces the second element, the positioning grooves are defined in the second surface.

8. The rotatable positioning structure as claimed in claim 3, wherein the positioning grooves are formed and spaced uniformly around the hole.

9. The rotatable positioning structure as claimed in claim 1, wherein the first element is separated into two parts along a divided line.

10. The rotatable positioning structure as claimed in claim 9, wherein the divided line divides the first element into two symmetrically equal halves.

\* \* \* \* \*

UNITED STATES PATENT AND TRADEMARK OFFICE
CERTIFICATE OF CORRECTION

PATENT NO. : 7,975,969 B2
APPLICATION NO. : 12/102015
DATED : July 12, 2011
INVENTOR(S) : Te-Sheng Jan et al.

It is certified that error appears in the above-identified patent and that said Letters Patent is hereby corrected as shown below:

Title Page, Item (73) "Assignees" should read:

-- Hong Fu Jin Precision Industry (ShenZhen) Co., Ltd., Shenzhen, Guangdong Province (CN); Hon Hai Precision Industry Co., Ltd., Tu-Cheng, New Taipei (TW). --

Signed and Sealed this
Fourth Day of October, 2011

David J. Kappos
*Director of the United States Patent and Trademark Office*